UNITED STATES PATENT OFFICE.

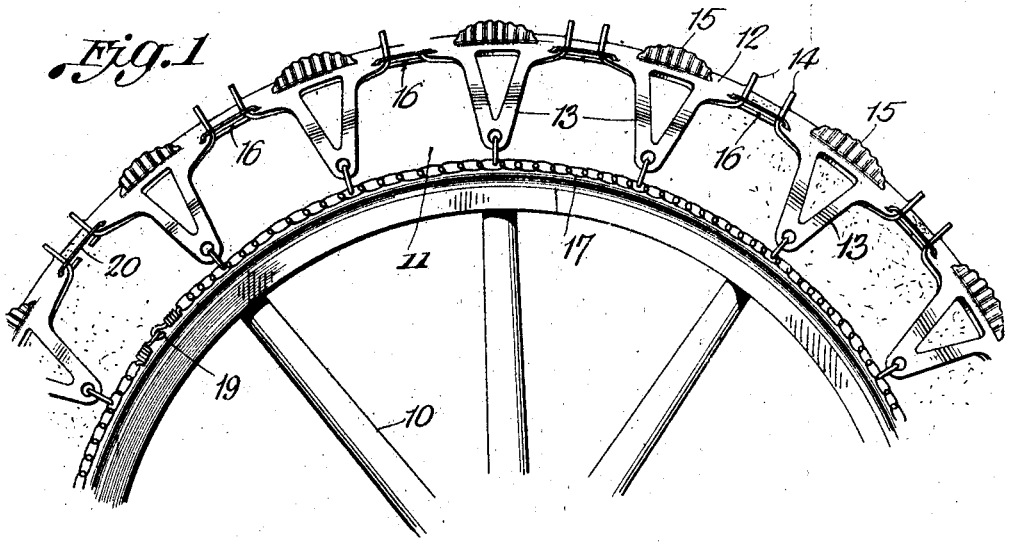
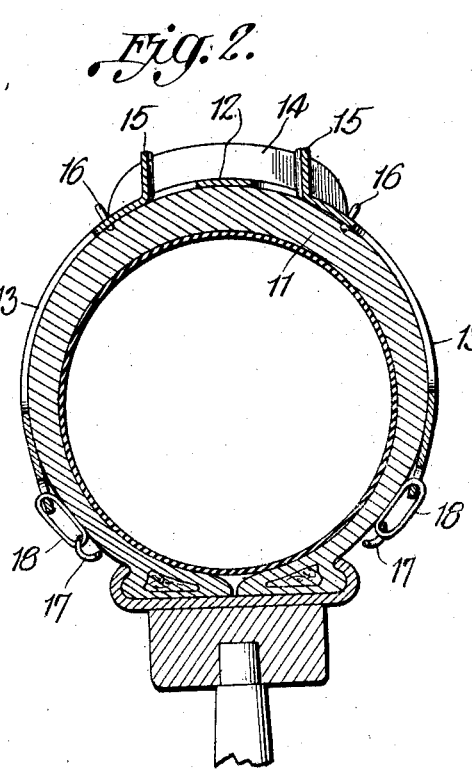
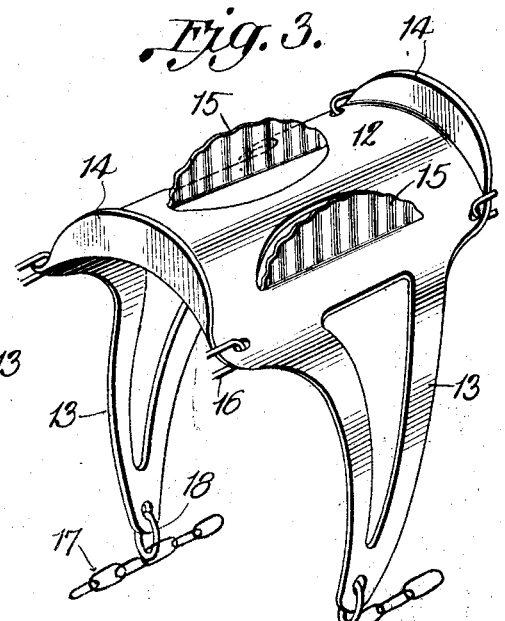

LEWIS L. KELLOGG, OF DENVER, COLORADO.

NON-SKID DEVICE.

1,338,934.             Specification of Letters Patent.            Patented May 4, 1920.

Application filed March 4, 1919. Serial No. 280,521.

*To all whom it may concern:*

Be it known that I, LEWIS L. KELLOGG, citizen of the United States, residing at Denver, in the county of Denver and State of Colorado, have invented certain new and useful Improvements in Non-Skid Devices, of which the following is a specification.

This invention relates to an improved non-skid device for motor vehicles and has as its primary object to provide a device of this character which may be readily applied around the tire casing of a vehicle wheel and which will be so constructed as to effectually prevent side slipping of the wheel while, at the same time, affording efficient traction for the wheel so that the wheel will not spin when power is applied thereto.

The invention has as a further object to provide a non-skid device employing a plurality of traction elements and wherein each of said elements will be provided with flanges designed to prevent spinning of the wheel and with other flanges designed to prevent side slipping of the wheel.

And the invention has as a still further object to provide an arrangement wherein each of the traction elements may be struck at a single operation from a piece of suitable resilient sheet metal and then the several elements flexibly connected to form the non-skid device.

Other and incidental objects will appear hereinafter. In the drawings:

Figure 1 is a fragmentary elevation showing my improved device applied to a conventional type of vehicle wheel and tire casing, Fig. 2 is a transverse sectional view more particularly illustrating the manner in which the traction elements of the device are adapted to fit transversely around the tire casing, and Fig. 3 is a perspective view showing one of the traction elements in detail.

Referring now more particularly to the drawings, I have illustrated my improved non-skid device in connection with a conventional type of motor vehicle wheel 10 upon which is shown an ordinary pneumatic tire having a casing 11. In carrying the invention into effect, I employ a series of flexibly connected elements of the type shown in detail in Fig. 3 of the drawings. Each of these elements is preferably formed of a single piece of suitable resilient sheet metal and includes an arcuate oblong body 12 from opposite sides of which extend depending arms 13 tapered toward their free ends. The arms 13 are preferably of skeleton construction and are curved longitudinally to conform to the curvature of the body. Formed on the body at its ends are upstanding traction flanges 14 disposed at substantially right angles to the body and having curved upper faces conforming substantially to the curvature of the body. The body is also equipped with transversely spaced segmental flanges 15 which upstand from the body at the inner ends of the arms 13 and are centered with respect to the arms. These flanges 15 are struck from opposite side portions of the body to extend longitudinally thereof and are disposed at substantially right angles to the body as well as to the flanges 14. Preferably, the flanges 15 are corrugated or fluted transversely so as to increase the traction thereof. The corrugations on the flanges 15 will also serve to strengthen and reinforce the same.

Extending between corresponding corners of the bodies 12 of the traction elements are links 16 loosely engaged in suitable openings in said bodies and connecting opposite corresponding arms of the elements are securing chains 17. Links 18 freely received through suitable openings in the ends of the arms and engaged with the chains serve to flexibly connect the elements with the chains. Thus, it will be seen that said elements are flexibly joined or secured together to provide an annular series. At their ends the chains 17 are respectively formed with a hook and eye, as indicated at 19, or other approved means for detachably connecting the chain ends, and detachably connecting the pair of traction elements at the junction of the ends of the chains are split links 20 similar to the links 16.

It is now to be observed that the traction elements are formed to snugly fit transversely around the tire casing 11 and the arms 13 are of a length to extend well down the sides of the casing so that when the ends of the chain 17 respectively are fastened together and the links 20 are arranged to connect the pair of elements at the ends of the chains, said chains will act to securely connect the device with the wheel extending circumferentially around the tire casing. Furthermore, as will be seen, the traction elements will be centered upon the tire casing so that the bodies 12 of said elements will overlie the tread of the casing. Consequently, the flanges 14 and 15 of the traction elements will be brought directly into contact with the road surface. The flanges 14 will provide a firm purchase for the wheel so as to prevent spinning thereof when power is applied to the wheel while the flanges 15 will coact with the road surface for preventing side slipping of the wheel in either direction. I accordingly provide a particularly effective device for the purpose set forth while, at the same time, the device is characterized by structural simplicity. In order that wheels and tire casings of different sizes may be fitted with the device the dimensions of the traction elements may, of course, be varied as well as the length of the securing chains therefor.

With reference to Fig. 1 it will be noted that the flanges 15 have the outer sides curved longitudinally for presenting a rounded surface to the ground during the rotation of the wheel. In presenting the rounded surface to the ground rotation of the wheel breaking down of the flanges is prevented and excessive wear on the same is also prevented.

Having thus described the invention, what is claimed as new is:

1. An antiskid device including a plurality of transversely curved tread sections arranged in end to end relation and having their adjacent end portions bent upwardly, said tread sections being provided with pairs of arcuate incisions thereby forming pairs of flanges having their outer sides curved longitudinally for presenting rounded surfaces to the ground, said flanges being corrugated transversely, and means to secure said tread sections in position.

2. An antiskid device including a plurality of transversely curved tread sections arranged in annular formation, each tread section being provided with a pair of arcuate incisions thereby forming pairs of flanges having their outer sides curved longitudinally, said flanges being extended upwardly from said tread sections and corrugated transversely, and means to secure said tread sections in position.

In testimony whereof I affix my signature.

LEWIS L. KELLOGG. [L. S.]